Jan. 27, 1959    J. C. TRIPPLEHORN    2,870,845
REVERSED SPIRAL MOLDED SCRAPER
Filed Sept. 17, 1956
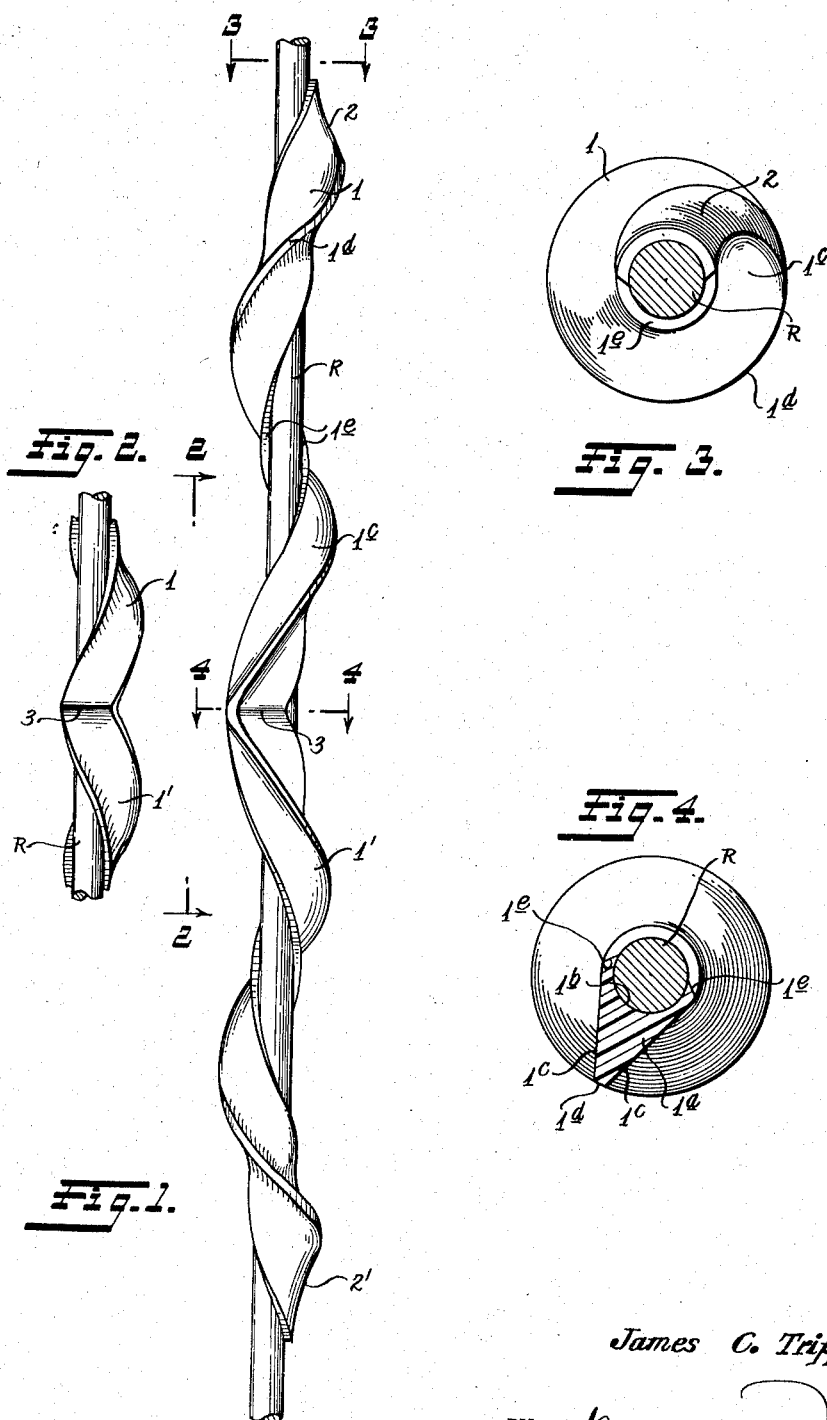
INVENTOR
James C. Tripplehorn
BY
ATTORNEYS

United States Patent Office 2,870,845
Patented Jan. 27, 1959

2,870,845

REVERSED SPIRAL MOLDED SCRAPER

James C. Tripplehorn, Pampa, Tex.

Application September 17, 1956, Serial No. 610,160

6 Claims. (Cl. 166—176)

My invention relates to paraffin scrapers for use in conjunction with oil-well pumping equipment or other similar devices, and more particularly relates to paraffin scrapers made of plastic material of the type having a "memory," such as nylon.

The principal object of my invention is to provide a plastic paraffin scraper which can be manufactured by molding in a form generally resembling presently known metal paraffin scrapers, and more particularly which can be molded in the form of two reverse spirals meeting at a cusp located intermediate the ends of the scraper.

In my copending patent application Serial No. 506,581, filed May 6, 1955, and entitled "Nylon Paraffin Scraper," I have set forth a general disclosure teaching the manufacture of paraffin scrapers by molding of plastic materials. The principal advantages of this type of construction, employing a plastic material having a "memory," include the advantage that the plastic exhibits spring qualities, causing it to tightly grip the sucker rod and at the same time permitting sufficient resilience so that the scraper is not easily damaged. In addition, the plastic material is strong and is very resistant to acid generally contained in oil-well fluids.

Other advantages gained by the use of plastics in paraffin scrapers include the fact that a plastic may be chosen which has a high dielectric constant to avoid electrolysis within the well, and also that a plastic material may be chosen which is almost entirely devoid of pores and therefore exhibits very little tendency to encourage the deposit of paraffin on its surfaces. My copending patent application also points out the advantages of the lightness of weight of the plastic material, and also the fact that, if a scraper made of this material is broken, the pieces thereof will float to the surface of the well and so facilitate their removal.

It is the purpose of the present invention to provide a paraffin scraper which not only includes all of the advantages set forth in the copending application, but in addition discloses the molding of a paraffin scraper wherein the direction of spiral of the scraper is reversed at a cusp intermediate the ends thereof, this type of reverse spiral scraper being especially useful in oil-well equipment wherein the sucker rods are all screwed together, because reverse spiraling does not tend to cause the rods to rotate and thereby unscrew one from another. It is admittedly old in the paraffin scraper art to employ both right-hand and left-hand spiral scrapers and to mount these scrapers alternately along the length of the sucker rods for the purpose of reducing the tendency of the scrapers to unscrew the rod joints when the assembly is reciprocated. The present invention, however, provides a practical scraper in which both the right-hand and the left-hand sections are provided in the same scraper body, such construction having been made practical by the fact that this scraper can be molded in one piece.

The prior art devices include scrapers of both right-hand and left-hand spiral, but not in one integral structure. In addition, the prior art includes tail pieces to be attached to sucker rods which are made of a length of metal flat stock spiraled in one direction and then spiraled in the other direction. However, in this latter structure, the blade does not spiral around the sucker rod. Aside from these broad differences the present invention includes other structural differences.

As in the case of the spiral scraper set forth in the above mentioned copending application, in order to realize the advantages of the use of nylon or other similar plastics in a paraffin scraper, it is necessary to change the structure of the prior art scrapers in order to provide a new scraper with the necessary rigidity to permit it to do a satisfactory scraping job, and also to provide it with the necessary grip which will permit it to hold fast to the sucker rod. In the scraper which is the subject matter of the present invention the cross-sectional shape of the nylon scraper intermediate the two terminal portions thereof is substantially a truncated triangle, the inner rod-gripping portion thereof having a semi-cylindrical concave surface of diameter somewhat smaller than the sucker rod which it is intended to grip. From this semi-cylindrical surface the nylon extends outwardly in a direction transverse of the rod on both sides to form a blade which terminates at its outer periphery in a narrow bearing surface adapted to contact and scrape against the sides of the well or against the well casing.

The semi-cylindrical surface is molded so as to form in the finished paraffin scraper a longitudinal bore through the center of the spiral body, which bore is somewhat smaller in diameter than the diameter of the sucker rod which the scraper is intended to fit. When the scraper is affixed to the sucker rod, the semi-cylindrical rod-gripping surface engages approximately one-half of the circumference of the rod, thus giving the blade portion of the scraper a very adequate support so as to prevent it from bending in a direction transverse to the spiral form of the scraper when the latter is reciprocated in the well. By this structure, the greater the load imposed upon the scraper within the well the tighter it grips the sucker rod in order to compensate for the greater load and in order to prevent slipping of the spiral scraper on the sucker rod. At each end of the body portion of the scraper there is a terminal portion which is specially shaped so as to prevent snagging of the ends of the scraper on the well casing joints. The terminal portions of the scraper in general correspond with the general spiral shape of the blade, and are formed by inward tapering of the outer bearing surface of the blade so as to gradually reduce the height of the blade as measured from the surface of the sucker rod to provide a streamlining effect on the ends of the blade.

The completed nylon paraffin scraper is not permanently affixed to the sucker rod, but rather is shipped separately therefrom and may be applied to the rod by suitable tools at the well site. I will now describe in detail the particular embodiments of my paraffin scraper illustrated in the drawing wherein:

Fig. 1 is an elevation view showing a sucker rod having one of my plastic paraffin scrapers attached thereto.

Fig. 2 is a partial elevation view of the scraper and rod illustrated in Fig. 1, this view being taken along line 2—2 of Fig. 1 and showing the cusp of the scraper as viewed from a position ninety degrees offset from that illustrated in Fig. 1.

Fig. 3 is an end view taken along line 3—3, Fig. 1.

Fig. 4 is a sectional view taken along line 4—4, Fig. 1.

Referring now to the drawing, Fig. 1 illustrates a sucker rod R around which is spiraled a plastic paraffin scraper the body of which includes a scraper blade 1, which blade terminates at each end in a terminal portion 2. The cross-section 1a of the body of the scraper can be clearly seen in Fig. 4 wherein is illustrated the semi-cylindrical rod-gripping surface 1b and the substantially triangular side surfaces 1c which terminate at the outer periphery of the scraper to provide an outer bearing surface 1d. Between the side portion 1c and the semi-cylindrical rod-gripping surface 1b are two lips 1e which grip the sucker rod R halfway around its outer circumference. By inspection of Figs. 1 and 2 it will be seen that the scraper is divided longitudinally at the cusp 3 which in this illustration is located midway between the ends of the scraper. Above the cusp 3 the scraping blade 1 winds around the rod in a right-hand spiral, and below the cusp 3 the blade 1' winds around the sucker rod R in a left-hand spiral. In connection with the two lip portions 1e and with the semi-cylindrical rod-gripping surface 1b it should be pointed out that before the plastic scraper is assembled to the sucker rod R, the diameter of the semi-cylindrical rod-gripping surface 1b, and therefore the diameter of the longitudinal bore which passes through the scraper body, is somewhat smaller than the outside diameter of the sucker rod, so that expansion of the lip portions 1e occurs when the spiral scraper is assembled on the sucker rod R. This structure insures that the scraper will engage the sucker rod with an extremely tight fit and that the spring characteristics of the plastic will serve to maintain a tight grip on the sucker rod throughout the useful life of the scraper.

The scraper is provided at its ends with terminal portions 2 and 2'. These terminal portions are similar in that each one amounts to an extension of the general spiral shape of the blade, but the outer bearing surface 1d is tapered inwardly toward the sucker rod. This structure is particularly well illustrated in Fig. 3 which is an end view of the scraper. The inner tapering of the bearing surface 1d of the outer periphery of the scraper at each end prevents snagging of the ends of the scraper on the joints of the casing in the well, and in addition provides end portions which have a neat and attractive appearance.

As set forth in the objects of this invention, the manufacturing of these paraffin scrapers by molding makes practical the composite scraper wherein the direction of the spiral is reversed intermediate the ends of the scraper body. The reversed spiral structure which I have illustrated in the drawing and described in detail is a structure which provides satisfactory strength for the molded paraffin scraper and in addition is a structure which can be economically manufactured.

I do not limit my invention to the exact form shown in the drawing, for changes may be made in the structure within the scope of the following claims.

I claim:

1. A reversed-spiral paraffin scraper for use on a rod comprising a blade adapted to spiral around the rod in a plurality of mutually-spaced open convolutions, said blade standing normal to the rod at all points along its length and having a semi-cylindrical rod gripping surface integral with the blade and the axis of the semi-cylindrical surface falling on a straight line comprising the axis of the scraper, the convolutions at one end of the scraper spiraling in a direction opposite to those at the other end of the scraper and the change of direction occurring at a cusp at the center of the scraper.

2. In a scraper as set forth in claim 1, said blade having an outer peripheral bearing surface, said surface being tapered inwardly toward the rod at the terminal portions of the scraper to prevent snagging of the ends.

3. A spiral paraffin scraper of plastic material adapted to spiral around and grip a sucker rod, comprising a body portion including two longitudinally distinct halves, one of right-hand spiral and the other of left-hand spiral, and said halves meeting and being integrally joined at a cusp where the direction of spiral reverses; said body portion standing normal to the surface of the rod along the length of the scraper to form a blade, and the inner periphery of the body having a rod-gripping concave surface complementary in shape to the surface of the rod and extending no more than half-way therearound at any location taken transversely of the rod.

4. A spiral paraffin scraper consisting of plastic material and adapted to spiral around and grip a sucker rod, comprising a spiral blade standing normal to the surface of the sucker rod and having a narrow outer peripheral bearing surface, and a broader inner rod gripping surface complementary to the rod surface and extending not more than half-way therearound; the blade spiraling through at least one convolution around the rod in a right-hand spiral and through at least one convolution in a left-hand spiral, and said spirals meeting at a cusp intermediate the ends of the scraper whereat the direction of spiraling reverses.

5. A spiral paraffin scraper consisting of plastic material and adapted to spiral around and grip a sucker rod, comprising a blade standing normal to the rod at all points and spiraling therearound to define a body having an outer spiral bearing surface and having an inner spiral rod-gripping surface all points of which lie on the surface of a semi-cylinder concentric with said rod and extending no more than half-way therearound; the convolutions of the blade extending longitudinally outwardly in both directions from a cusp located intermediate the ends of the body and the direction of spiraling of the blade being reversed at the cusp.

6. A spiral paraffin scraper consisting of plastic material and adapted to engage and grip a sucker rod, said scraper comprising a spiraling blade standing normal to the surface of the rod and having an inner periphery defining an axial rod-receiving bore, the inner periphery at all points longitudinally of the scraper surrounding no more than half of the circumference of the rod and being complementary in shape therewith, the outer periphery of the blade lying in a cylindrical plane coaxial with said rod, said blade spiraling around said rod in one direction over part of its length and in the other direction for the remainder of its length, and the change of direction occurring at a cusp intermediate the scraper ends.

References Cited in the file of this patent

UNITED STATES PATENTS

| 1,639,660 | Neumeyer | Aug. 23, 1927 |
| 1,810,260 | Swinford | June 16, 1931 |
| 1,891,615 | Bostic | Dec. 20, 1932 |

FOREIGN PATENTS

| 11,425 | Great Britain | June 23, 1900 |